W. COY.
PACKING.
APPLICATION FILED MAR. 4, 1911.
1,067,000.
Patented July 8, 1913.
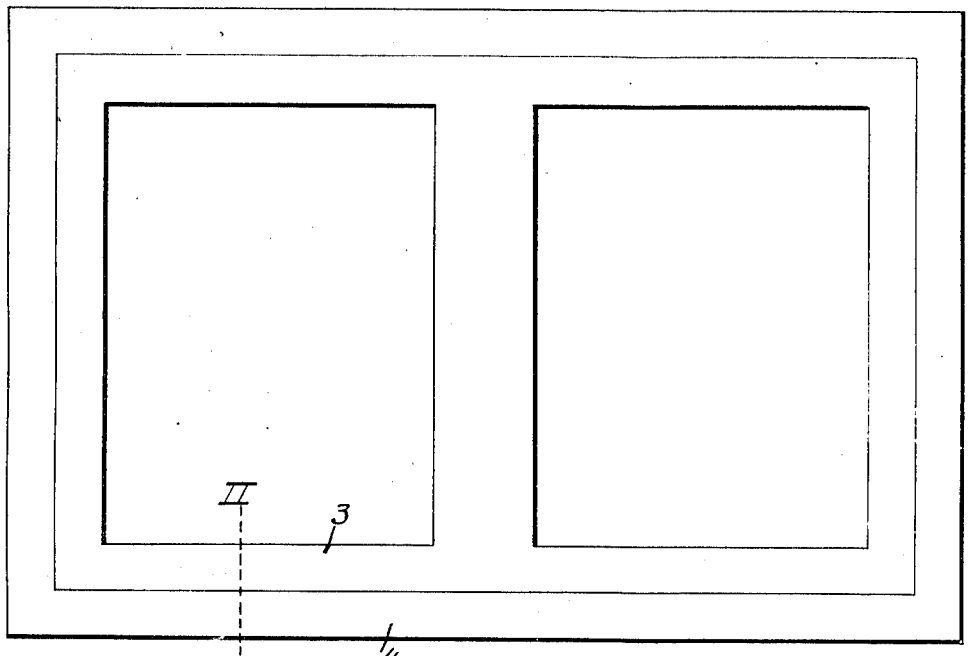
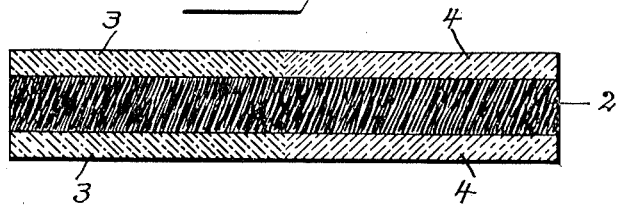
WITNESSES
Marshall Low
L. C. Brady
INVENTOR
Willis Coy
By John S. Barker
Attorney

UNITED STATES PATENT OFFICE.

WILLIS COY, OF COUNCIL BLUFFS, IOWA.

PACKING.

1,067,000.

Specification of Letters Patent. Patented July 8, 1913.

Application filed March 4, 1911. Serial No. 612,584.

*To all whom it may concern:*

Be it known that I, WILLIS COY, a citizen of the United States, residing at Council Bluffs, in the county of Pottawattamie and State of Iowa, have invented a new and useful Packing, of which the following is a specification.

My invention relates to packing for steam and other joints and has for its object to produce a packing of compound nature or composition especially adapted for use under conditions where one portion of one or both surfaces of the packing is subjected to certain conditions and another portion of the said surface or surfaces to essentially different conditions, the composition or nature of the packing in its different parts varying and being adapted to the conditions to which in use it is subjected.

The invention is especially well adapted for use in packing a locomotive saddle joint, where, as is well known, steam, often at high pressure and temperature, passes through the center of the joint, while around the outside thereof passes flaming products of combustion and gases, often corrosive in their nature heated to temperatures greatly above that of the vapors and gases passing through the center of the joint. To properly resist these different conditions the packing employed when made according to my invention has its inside portion or portions, that is, the parts contiguous to the edges surrounding the central opening or flue through which passes the exhaust steam, formed of a composition adapted to resist both moisture and dry steam, while those portions of the packing that are contiguous to the outer edges and which are next to the flue or conduit through which pass the heated gases and products of combustion, are formed of a composition especially adapted to resist hot and destructive gases of combustion.

In making a packing for a locomotive saddle joint I prepare a sheet of material of the proper shape to serve as the support or connecting medium of the entire packing, as for instance, a piece of wire gauze, perforated metal, asbestos, or other thin sheet-like, binding material, and upon the opposite faces of this lay the substance employed to produce the compound packing. Immediately adjacent to the central opening in the packing and extending approximately half way therefrom to the outer edges thereof, I apply the material which constitutes that portion of the packing that is employed to resist the action of steam and moisture, while adjacent to the outer edges of the supporting binder I apply the materials or compound constituting the portions of the packing adapted to resist the action of very highly heated and corrosive gases.

For that part of the packing adjacent to the inner edges thereof I may employ a compound consisting of red or white lead, Babbitt metal filings, asbestos fibers and gypsum, mixed and made soft so as to be easily applied and also to flow or yield when applied and subjected to pressure, by linseed oil, with which may be mixed plumbago or soap stone. For the outer portions of the packing, those which are to resist higher temperatures and the action of products of combustion and corrosive gases I employ red or white lead, iron borings, litharge and gypsum, made soft or of a putty-like consistency with linseed oil. These compositions are applied to the respective portions of the connecting and supporting sheet in proper quantities to make a joint of the required thickness and are rendered smooth and shaped according to well known methods of making steam joint packing. Upon the surfaces of the packing is then sprinkled a thin coating of gypsum or similar material that will absorb or take up the oil at the surface of the packing and form a temporary protective coating, leaving the center sufficiently soft to flow or yield when applied and subjected to pressure.

I do not wish to be understood as limiting my invention to a packing formed of the exact compositions mentioned, by way of illustrating my invention, nor to the single use thereof which has been mentioned, as it is apparent that the invention is adapted to a wide variety of uses where a compound packing the different portions of which are subjected to different conditions, is desirable.

It will be evident that different compositions will be employed under different conditions and these may be produced in quantities to be used in making the compound packing in the manner described.

In the accompanying drawings I have illustrated a packing for a locomotive saddle joint embodying my invention.

Figure 1 is a plan view of the packing; and Fig. 2 is a cross sectional view taken on the line II—II of Fig. 1.

In such drawings 2 designates the sheet constituting the binder or support for the packing, 3 that composition which is applied thereto and is of a nature to resist the action of steam and moisture; and 4 is that composition applied thereto and of a nature to resist highly heated and corrosive gases. In Fig. 2 there is no attempt made to accurately indicate the proportional thicknesses of the several parts of the composition, as these may be varied within wide limits to suit the conditions under which the packing is used.

What I claim is:—

A compound joint packing adapted to be used where its different surface portions are subjected to widely different conditions consisting of a sheet constituting a binder, a composition applied to a certain portion of one surface thereof adjacent to one edge and of a nature to resist certain conditions to which the packing at this place is subjected and having applied to said surface and adjacent to another edge a composition adapted to resist other conditions to which that portion of the packing is exposed, substantially as set forth.

WILLIS COY.

Witnesses:
 THOS. G. GREEN,
 HELEN GREEN.